(12) United States Patent
Clement et al.

(10) Patent No.: US 8,116,706 B1
(45) Date of Patent: Feb. 14, 2012

(54) METHOD AND APPARATUS FOR CALIBRATING A BANDPASS FILTER

(75) Inventors: Patrick Clement, Belmont (CH); King Chu Tsai, San Jose, CA (US); Heinz Maeder, Weinfelden (CH)

(73) Assignee: Marvell International Ltd., Hamilton (BM)

( * ) Notice: Subject to any disclaimer, the term of this patent is extended or adjusted under 35 U.S.C. 154(b) by 975 days.

(21) Appl. No.: 11/970,133

(22) Filed: Jan. 7, 2008

Related U.S. Application Data

(60) Provisional application No. 60/883,597, filed on Jan. 5, 2007.

(51) Int. Cl.
*H04B 1/18* (2006.01)

(52) U.S. Cl. ....... 455/179.1; 455/87; 455/138; 455/120; 455/125; 375/350; 324/616

(58) Field of Classification Search ............... 455/179.1, 455/87, 138, 120, 125; 375/350; 324/616
See application file for complete search history.

(56) References Cited

U.S. PATENT DOCUMENTS

| | | | |
|---|---|---|---|
| 5,280,638 A * | 1/1994 | Porambo et al. | 455/143 |
| 6,597,748 B1 | 7/2003 | Hietala et al. | |
| 6,670,861 B1 * | 12/2003 | Balboni | 332/103 |
| 6,678,340 B1 | 1/2004 | Khlat et al. | |
| 6,865,381 B2 * | 3/2005 | Vorenkamp et al. | 455/307 |
| 6,978,117 B2 | 12/2005 | Zerod et al. | |
| 7,127,217 B2 * | 10/2006 | Tuttle et al. | 455/87 |
| 7,158,774 B2 * | 1/2007 | Helio et al. | 455/340 |
| 2003/0083836 A1 * | 5/2003 | Spencer | 702/107 |
| 2005/0189951 A1 * | 9/2005 | Ibrahim et al. | 324/616 |
| 2007/0129034 A1 * | 6/2007 | Adams et al. | 455/138 |
| 2010/0156575 A1 * | 6/2010 | Shah et al. | 334/78 |

* cited by examiner

*Primary Examiner* — Sanh Phu

(57) ABSTRACT

To calibrate a bandpass filter, a received signal strength corresponding to a received communication channel is determined. A variable element of the bandpass filter is adjusted based on the received signal strength of the received communication channel to calibrate the bandpass filter.

23 Claims, 8 Drawing Sheets

METHOD AND APPARATUS FOR CALIBRATING A BANDPASS FILTER

CROSS-REFERENCES TO RELATED APPLICATIONS

The present application claims the benefit of U.S. Provisional Application No. 60/883,597, entitled "ADAPTIVE ANTENNA NETWORK," filed on Jan. 5, 2007, the entire contents of which are hereby incorporated by reference herein.

FIELD OF TECHNOLOGY

The present disclosure relates generally to communication systems, and more particularly, to tunable radio frequency bandpass filters.

DESCRIPTION OF THE RELATED ART

Radio frequency (RF) receivers, such as frequency modulation (FM) receivers for receiving audio broadcasts, often utilize an RF bandpass filter to attenuate signals outside of the range of frequencies that are to be received. For example, such a filter may be used to attenuate signals outside of the band of frequencies in the United States in which FM is used for broadcasting audio signals (hereinafter the "FM broadcast band in the U.S."). FIG. 1 is a diagram of a frequency response 40 of an RF bandpass filter for use in receivers to receive the FM audio broadcast band in the U.S., which extends from substantially 87.5 MHz to 108 MHz. Such a frequency response may be achieved by an LC tank circuit coupled to a loop antenna.

In FIG. 1, the pass band of the RF bandpass filter passes the entire FM broadcast band. But other RF bandpass filters may utilize a narrower pass band (corresponding to a higher quality factor (Q)). For instance, it may not be economically practical to utilize a broadband filter such as in FIG. 1 with certain types of receivers or certain types of antennas. For example, antennas often used with portable broadcast receivers may have an impedance that makes it economically impractical to utilize a broadband RF bandpass filter.

Thus, in some cases, the RF bandpass filter of a receiver might not be able to pass adequately the entire band of interest. In such situations, a tunable RF bandpass filter may be utilized. FIG. 2 is a diagram illustrating a frequency response 50 of a tunable RF bandpass filter. As can be seen in FIG. 2, the passband of the bandpass filter is not wide enough to pass the entire FM broadcast band. Thus, the bandpass filter may be tuned to different center frequencies based on the particular broadcast station that is to be received. The dotted lines in FIG. 2 illustrate the bandpass filter tuned at different center frequencies.

A tunable RF bandpass filter such as in FIG. 2 is typically implemented with a circuit that includes an inductor and a capacitor, such as an LC tank circuit. Inductors and capacitors typically have manufacturing variances. Thus, a tunable RF bandpass filter is calibrated in order to compensate for the variance from the designed inductance and capacitance values. Calibration typically involves calibrating a variable capacitor of the LC tank circuit in an attempt to calibrate the bandpass filter. In one calibration technique, a calibration circuit is included which generates a reference signal at a known frequency that is then provided to the bandpass filter. The variable capacitor is varied in order to minimize attenuation of the reference signal.

In another technique, the variable capacitor of the tank circuit may be matched to an already calibrated capacitor. This technique also requires additional calibration circuitry. Additionally, because only the capacitor is calibrated, the tolerance of the inductor will adversely affect the calibration of the bandpass filter as a whole.

SUMMARY OF THE DISCLOSURE

In one embodiment, a method for calibrating a bandpass filter of a receiver comprises determining a received signal strength corresponding to a received communication channel, and adjusting a variable element of the bandpass filter based on the received signal strength of the received communication channel to calibrate the bandpass filter.

In another embodiment, a receiver includes a radio frequency (RF) bandpass filter having a variable element, and a downconverter coupled to the RF bandpass filter, the downconverter including a received signal strength measurement module. The receiver also includes a controller coupled to the variable element of the adjustable RF bandpass filter and coupled to the received signal power measurement module of the downconverter. The controller is configured to calibrate the RF bandpass filter by adjusting the variable element based on a received signal strength corresponding to a communication channel received by the receiver.

In yet another embodiment, a method for calibrating a bandpass filter of a receiver comprises selecting a received broadcast channel from a plurality of received broadcast channels, and adjusting the receiver toward a center of the selected received communication channel. The method additionally comprises freezing an automatic gain control of the receiver, and determining a received signal strength corresponding to the received communication channel. The method further comprises adjusting a variable element of the bandpass filter based on the received signal strength of the received communication channel to calibrate the bandpass filter.

In still another embodiment, a tangible medium stores machine readable instructions that are capable of causing one or more processors to calibrate an RF bandpass filter having an adjustable element by generating control signals to adjust the variable element based on a received signal strength corresponding to a communication channel received by a receiver.

DETAILED DESCRIPTION

Figure 3:
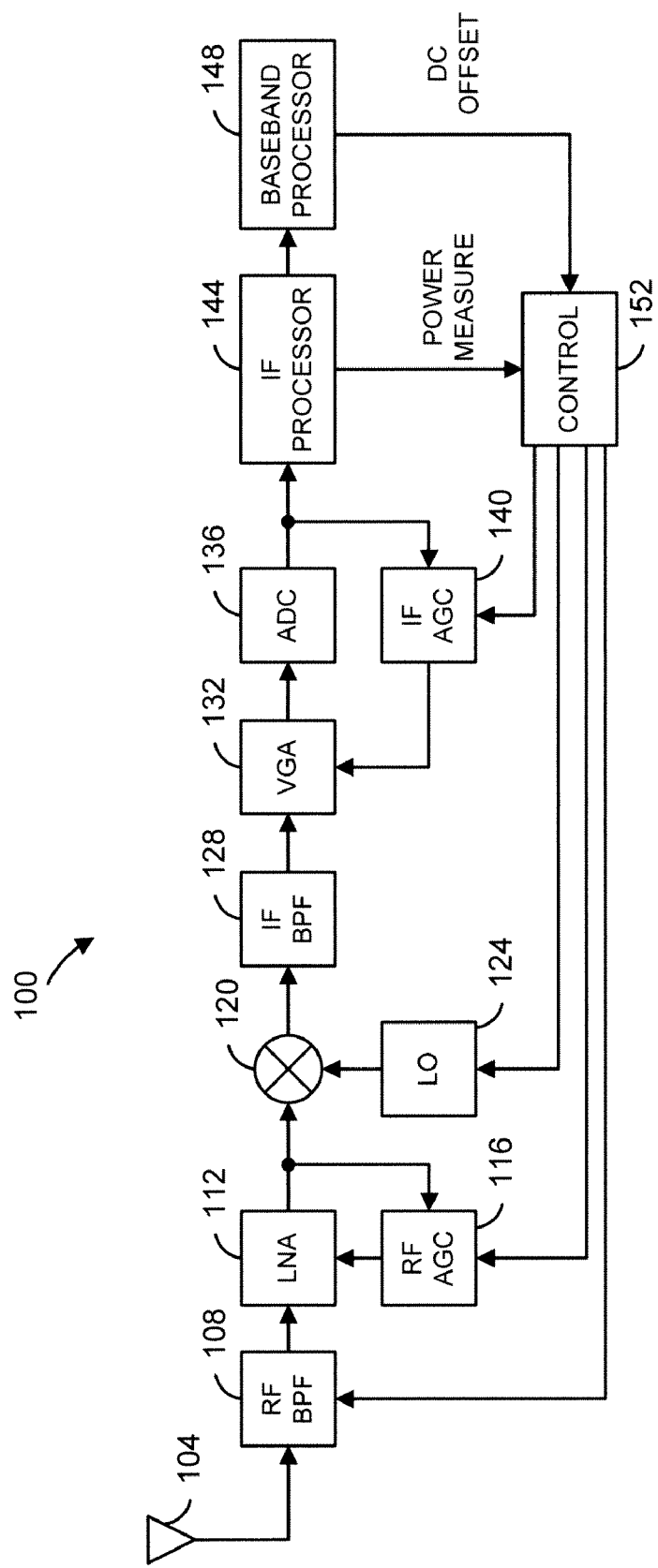
FIG. 3 is a block diagram of an example receiver that utilizes a tunable RF bandpass filter.

FIG. 3 is a block diagram of an example receiver 100. The receiver 100 may be for receiving the FM broadcast band of the U.S., Europe, Japan, etc. The receiver includes an antenna 104 coupled to a radio frequency (RF) bandpass filter 108. The antenna may be, for example, a loop antenna, the wires of a headphone cord, a metal pad, a metal pad mounted on a device such as a wireless headset so that, when worn, the metal pad will be in contact with a person's skin, etc. The RF bandpass filter 108 may include a tunable element, such as a variable capacitor. The RF bandpass filter 108 is a tunable filter so that its center frequency can be changed.

The RF bandpass filter 108 may be coupled to a low noise amplifier (LNA) 112. The LNA 112 may be a variable gain amplifier and may be coupled to an automatic gain control (AGC) module 116 that adjusts the gain of the LNA 112. An output of the LNA 112 may be coupled to a mixer 120 that translates a received RF communication channel to an intermediate frequency (IF) based on an output of a local oscillator (LO) 124. An output of the mixer 120 may be coupled to an IF bandpass filter 128 that rejects unwanted signals and passes the selected channel.

An output of the IF bandpass filter 128 may be coupled to a variable gain amplifier (VGA) 132. An output of the VGA 132 may be coupled to an analog-to-digital converter (ADC) 136. An AGC module 140 generates a control signal to vary the gain of the VGA 132 and acts to control the VGA 132 in an attempt to best fit the IF signal within the a dynamic range of the ADC 136.

An output of the ADC 136 is provided to an IF processor 144 that converts the IF signal to a baseband signal. The IF processor 144 may include a signal strength measurement module that generates a measurement of the signal strength of the IF signal. For example, the IF processor 144 may include a power measurement module such as a received signal strength indicator (RSSI) module that generates RSSI measurements for the IF signal.

The mixer 120, the LO generator 124, the ADC 136, and the IF processor 144 may act as a downconverter to convert the received RF signal to baseband.

The IF processor 144 may be coupled to a baseband processor 148 that processes the baseband signal. The baseband processor may include a signal strength measurement module that generates a measurement of the signal strength of the baseband signal. For example, the baseband processor 148 may include a power measurement module such as an RSSI module that generates RSSI measurements for the baseband signal.

The baseband processor 148 also may include a DC offset measurement module. In an FM receiver, an offset in the LO frequency results in a DC offset of the demodulated baseband signal. Thus, the measure of DC offset from the DC offset measurement module may be useful in adjusting the LO frequency.

If the broadcast signal includes digital information, the baseband processor 148 optionally may include a module that measures the error rate of the received signal, such as a bit error rate (BER) measurement module. The BER measurement of the received signal may provide an indication of the signal strength of the received signal.

The receiver 100 also may include a controller 152 coupled to the IF processor 144 and/or the baseband processor 148. The controller 152 may receive from the IF processor 144 and/or the baseband processor 148 signal strength measurements (e.g., RSSI measurements, BER measurements, etc.). Additionally, the controller 152 may receive from the baseband processor 148 an indication of the DC offset of the baseband signal. Also, the controller 152 may be coupled to the RF bandpass filter 108 and the LO 124. The controller 152 may generate various control signals for controlling the RF bandpass filter 108 and the frequency of the LO 124. For example, the controller 152 may generate a signal for tuning center frequency of the RF bandpass filter 108 and a signal for adjusting the frequency of the LO 124. Additionally, the controller 152 may generate a signal for calibrating the RF bandpass filter 108, as will be described in more detail below.

Additionally, the controller 152 may be coupled to the RF AGC module 116 and the IF AGC module 140, and may generate one or more control signals for controlling the RF AGC module 116 and the IF AGC module 140. For example, the controller 152 may generate one or more control signals for causing the RF AGC module 116 and the IF AGC module 140 to freeze or unfreeze.

The controller 152 may be implemented by some combination of hardware, software and/or firmware. For example, the controller 152 may be implemented at least partially by a processor such as a general purpose processor, a special purpose processor such as a digital signal processor (DSP), a microcontroller, etc.

Figure 1:
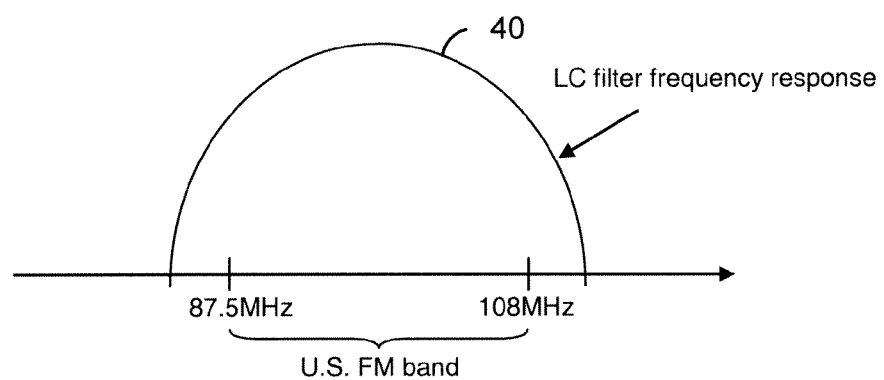
FIG. 1 is a frequency response diagram for a radio frequency (RF) bandpass filter for a receiver to receive frequency modulation (FM) audio broadcasts in the United States.
Figure 2:
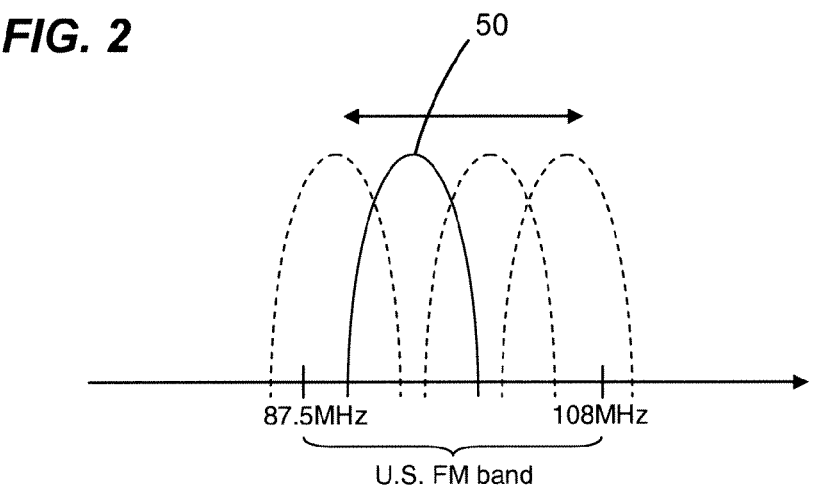
FIG. 2 is a frequency response diagram for a tunable RF bandpass filter for a receiver to receive FM audio broadcasts in the United States.

The receiver 100 may be implemented in a variety of ways. In one implementation, much of the receiver may be implemented on one or more integrated circuits (ICs), and some portions may be implemented at least partially with discrete components. For example, all blocks in FIG. 1, except the antenna 104 and a portion of the RF bandpass filter 108 may be implemented on one or more ICs. In other words, the RF bandpass filter 108 may comprise one or more components on an IC and one or more discrete components.

Figure 4:
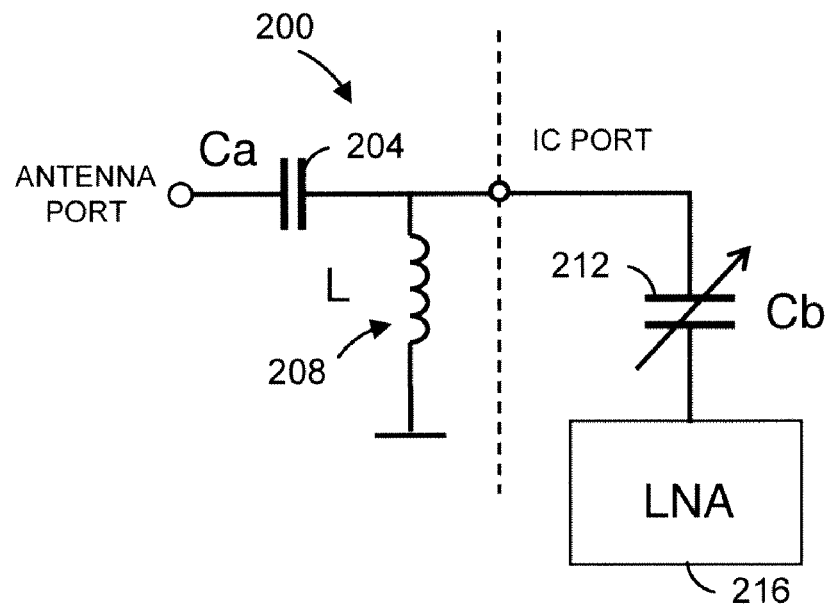
FIG. 4 is a diagram of an example RF bandpass filter that may be utilized in the receiver of FIG. 3.

FIG. 4 is a diagram of an example RF bandpass filter 200 that may be utilized with the receiver 100 of FIG. 3. The RF bandpass filter 200 includes an L-C network. Of course, the receiver 100 may utilize an RF bandpass filter other than the RF bandpass filter 200, and the RF bandpass filter 200 may be utilized with receivers other than the receiver 100 of FIG. 3. In FIG. 4, components to the left of the vertical dashed line may be discrete components, and components to the right of the vertical dashed line may be components on an IC. In the RF bandpass filter 200, the tunable element is a variable capacitor. In other RF bandpass filter implementations, the tunable element need not be a capacitor.

The RF bandpass filter 200 includes a discrete capacitor (Ca) 204 coupled between an antenna and an IC port. The RF bandpass filter 200 also includes an inductor (L) 208 coupled between the IC port and a reference voltage such as an analog ground. Additionally, the RF bandpass filter 200 includes a variable capacitor (Cb) 212 coupled to an LNA 216. If the RF bandpass filter 200 is utilized in the receiver 100, the LNA 216 of FIG. 4 may correspond to the LNA 112 of FIG. 3. The RF bandpass filter 200 may be tuned and calibrated by adjusting the capacitance of the variable capacitor Cb 212.

Figure 5:
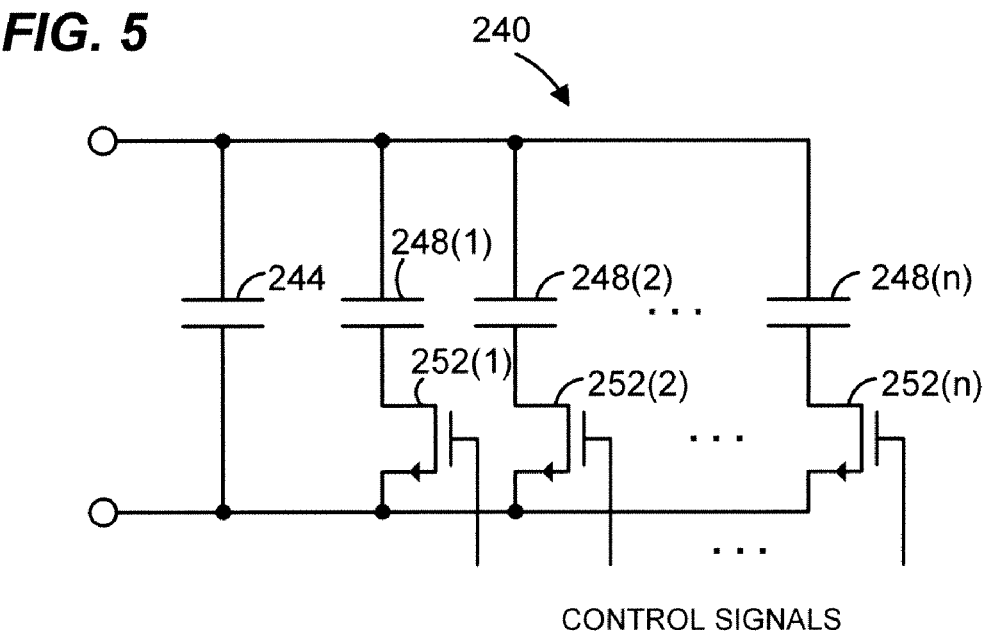
FIG. 5 is a diagram of an adjustable capacitor that may be utilized in the RF bandpass filter of FIG. 4.

FIG. 5 is a circuit diagram of an example variable capacitor 240 that may be utilized in the RF bandpass filter 200 of FIG. 4 (e.g., the variable capacitor 212 of FIG. 4 may include the variable capacitor 240). Of course, the RF bandpass filter 200 may utilize a variable capacitor other than the variable capacitor 240, and the variable capacitor 240 may be utilized with RF bandpass filters other than the RF bandpass filter 200 of FIG. 4.

The variable capacitor 240 includes a capacitor 244 and a plurality of capacitors 248(1), 248(2), . . . , 248(n). The variable capacitor 240 also includes a plurality of n-channel metal oxide semiconductor (NMOS) transistors 252(1), 252 (2), . . . , 252(n), each NMOS transistor 252 coupled in series with a corresponding capacitor 248. Control signals may turn individual transistors 252 ON or OFF in order to add or remove individual capacitors 248 from the overall capacitance of the capacitor 240. Although in FIG. 5 the transistors 252 are illustrated as being NMOS transistors, other types of transistors may be used as well such as p-channel metal oxide semiconductor (PMOS) transistors.

If a variable capacitor such as the variable capacitor 240 is utilized with the receiver 100 (FIG. 3), the control signals may be generated by the controller 152. Optionally, the variable capacitor 240 may include a circuit that converts a first multibit control signal from the controller 152 into second control signals that may be provided to the transistors 252.

Figure 6:
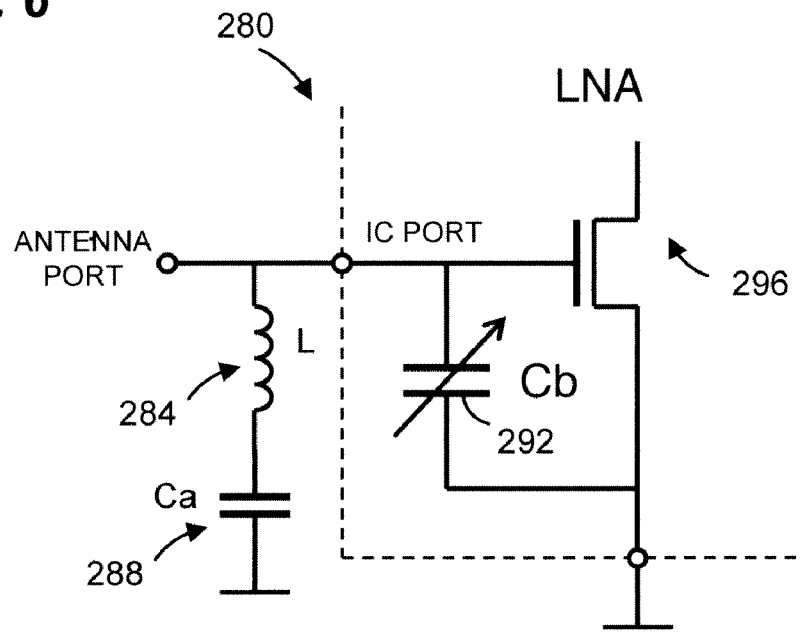
FIG. 6 is a diagram of another example RF bandpass filter that may be utilized in the receiver of FIG. 3.

FIG. 6 is a diagram of another example RF bandpass filter 280 that may be utilized with the receiver 100 of FIG. 3. The RF bandpass filter 280 includes an L-C network. Of course, the receiver 100 may utilize an RF bandpass filter other than the RF bandpass filter 280, and the RF bandpass filter 280 may be utilized with receivers other than the receiver 100 of FIG. 3. In FIG. 6, components to the left of the vertical dashed line may be discrete components, and components to the right of the vertical dashed line may be components on an IC. In the RF bandpass filter 280, the tunable element is a variable capacitor 292.

In the RF bandpass filter 280, the antenna may be coupled directly to the IC port. The RF bandpass filter 280 includes an inductor (L) 284 and a capacitor (Ca) 288 coupled in series between the IC port and a reference voltage such as an analog ground. The capacitor Ca 288 may be a bypass capacitor, for example. The RF bandpass filter 280 also includes a variable capacitor (Cb) 292 coupled between the IC port and a reference voltage such as an analog ground. The reference voltage coupled to the capacitor Ca 288 and the reference voltage coupled to the capacitor Cb 292 may be connected or may be separated depending on the particular implementation. An input of an LNA 296 may be coupled to the IC port. In FIG. 6, a portion of the LNA 296 is illustrated. If the RF bandpass filter 280 is utilized in the receiver 100, the LNA 296 of FIG. 6 may correspond to the LNA 112 of FIG. 3. The RF bandpass filter 280 may be tuned and calibrated by adjusting the capacitance of the variable capacitor Cb 292. The variable capacitor Cb 292 may be the variable capacitor 240 of FIG. 5 or some other variable capacitor.

Figure 7:
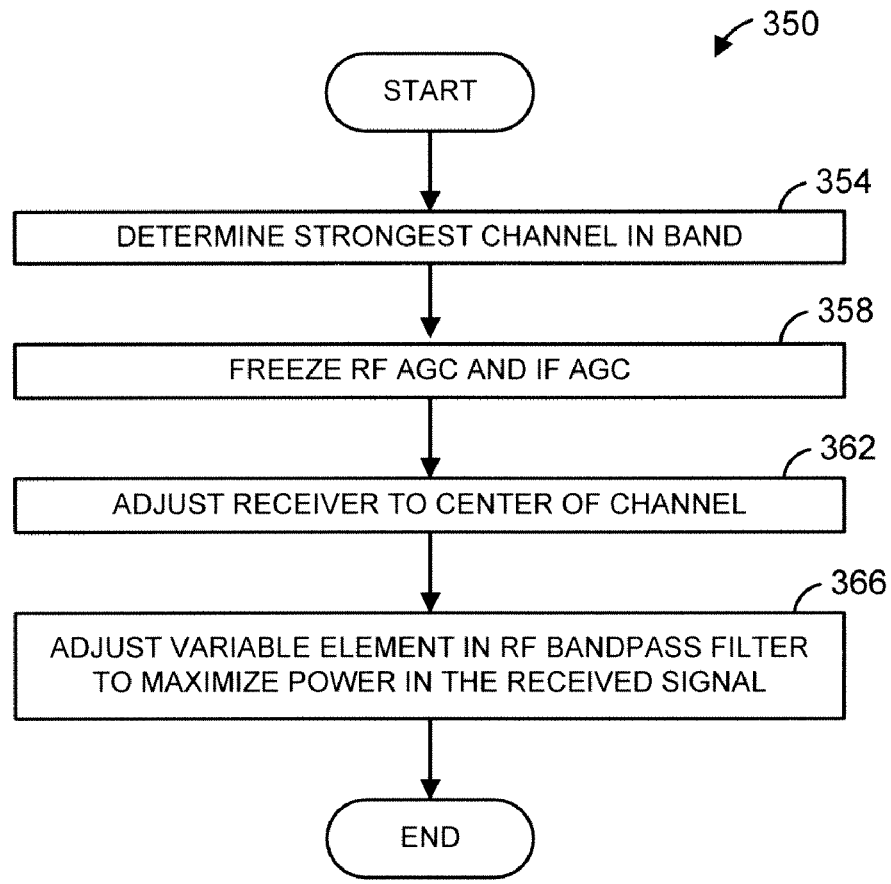
FIG. 7 is a flow diagram of an example method for calibrating a tunable RF bandpass filter that may be implemented by the receiver of FIG. 3.

FIG. 7 is a flow diagram of an example method 350 for calibrating an RF bandpass filter. The method 350 may be implemented by the receiver 100 of FIG. 3 and will be described with reference to FIG. 3 for ease of explanation. Of course, the receiver 100 may utilize a calibration method other than the calibration method 350, and the calibration method 350 may be utilized with receivers other than the receiver 100 of FIG. 3.

At a block 354, a strongest communication channel in the band to be received by the receiver is determined. This generally may comprise tuning the receiver to a plurality of frequencies in the band of interest and measuring the received signal strength at each frequency. Tuning the receiver may include tuning the RF bandpass filter so that the frequency to which the receiver is tuned is within the passband of the RF bandpass filter. Because the RF bandpass filter may not yet be calibrated, its center frequency may be offset from an expected center frequency. But this offset may be ignored during the block 354. Determining the received signal strength may comprise determining an RSSI measurement or some other power measurement, a BER measurement, etc.

In the receiver 100, the controller 152 may tune the receiver 100 to various frequencies by controlling the RF bandpass filter 108 and the LO generator 124, for example. The controller 152 may receive signal strength measurements from the IF processor 144 and/or the baseband processor 148. For instance, the controller 152 may receive RSSI measurements from an RSSI block in the IF processor 144 and/or the baseband processor 148. Optionally, the controller 152 may receive a BER measurement from a BER measurement block in the baseband processor 148. The controller 152 may use the signal strength measurements to determine a communication channel corresponding to the highest received signal strength.

At a block 358 the receiver may be tuned to the strongest communication channel and the RF AGC and the IF AGC may be frozen. In the receiver 100, the controller 152 may tune the receiver 100 to the strongest channel by controlling the RF bandpass filter 108 and the LO generator 124, for example. Additionally, the controller 152 may freeze the RF AGC 116 and the IF AGC 140.

At a block 362, the receiver may be adjusted so that it is tuned approximately to the center of the channel. In a superheterodyne receiver, this may include adjusting the LO of the IF. In a superheterodyne receiver for receiving FM signals, the LO frequency offset may be measured by measuring a DC offset of the baseband demodulated signal. Thus, in the receiver 100, the controller 152 may receive a DC offset measurement from a DC offset measurement module in the baseband processor 148, and may control the LO generator 124 to adjust the frequency of the LO in order to minimize the DC offset. The DC offset need not be reduced to zero.

At a block 366, the variable element in the RF bandpass filter may be adjusted to maximize the signal strength of the received signal. Once adjusted, the RF bandpass filter is calibrated. Any number of techniques may be utilized to adjust the variable element of the RF bandpass filter so that the received power is maximized. In one implementation, a binary search algorithm may be utilized. Of course, in other implementations, other search algorithms may be utilized. Also, signal strength measurements at all possible settings of the variable element may be made, and the highest signal strength measurement may be selected.

Figure 8:
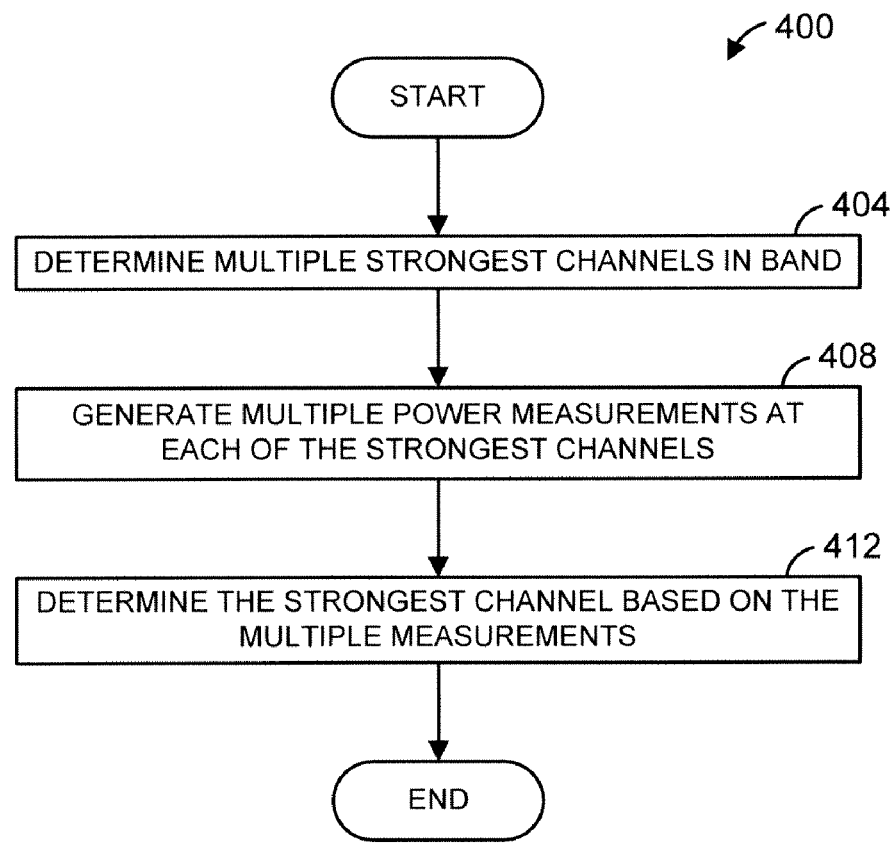
FIG. 8 is a flow diagram of an example method for determining a strongest channel that may be utilized in the method of FIG. 7.

Determining a strongest communication channel in the band (block 354) may be implemented in one or more stages. FIG. 8 is a flow diagram of an example method 400 for determining a strongest channel in two stages. For example, in a first stage, a subset of the received channels, such as three (or some other integer greater than one such as 2, 4, 5, 6, etc.) channels, with the highest received signal strength are determined by tuning the receiver to a plurality of frequencies in the band of interest and taking one signal strength measurement at each frequency. Frequencies having the top three (or some other integer greater than one) measurements are selected as the top strongest channels.

In a second stage, multiple signal strength measurements may be taken at a block 408 for each of the channels determined at the block 404. For example, five or some other number (e.g., 2, 3, 4, 6, 7, 8, 9, etc.) of signal strength measurements (e.g., RSSI measurements, BER measurements, etc.) may be generated for each channel. Each measurement may be generated based on analyzing the received signal for some period of time.

At a block 412, a strongest channel may be determined based on the multiple signal strength measurements generated at the block 408. For example, an average signal strength measurement may be calculated for each channel based on the multiple measurements, and the channel with the highest average signal strength measurement may be selected as the channel with the highest signal strength. By generating multiple signal strength measurements for each channel, fading may have less of an effect on the determination of the channel with the highest signal strength.

Although in the method 350 of FIG. 7, the RF bandpass filter was calibrated at one channel, in other implementations the RF bandpass filter may be calibrated at multiple channels in different portions of the band of interest. For example, if a method such as the method 400 of FIG. 8 is utilized to determine multiple strongest channels, the RF bandpass filter may be calibrated at each of at least two of the strongest channels. Also, a variation of the method 350 may be utilized in which the method is utilized on different portions of the band of interest. As just one example, the band of interest could be partitioned into three (or some other number such as 2, 4, 5, etc.) portions, and a method similar to the method 350 could be utilized in each portion to calibrate the RF bandpass filter in each portion.

Additionally, determining strongest channels may include ignoring channels that have a low signal strength. For example, if the receiver attempts to calibrate to multiple channels, but there is one well received channel, the receiver may ignore channels that have a signal strength below some threshold, even if they are considered one of the strongest three channels, for example. Similarly, if the receiver cannot find any channels having a minimum signal strength, calibration may be aborted. One of ordinary skill in the art will recognize many other variations.

Although calibration of an RF bandpass filter was described with reference to an FM superheterodyne receiver, similar techniques may be utilized with other types of receivers such as direct conversion receivers, AM receivers, quadrature amplitude modulation (QAM) receivers, vestigial sideband receivers, orthogonal frequency division modulation (OFDM) receivers, etc. Further, although calibration of an RF bandpass filter was described with reference to a receiver coupled to an antenna, an antenna is not necessary. For example, similar techniques may be utilized with receivers that do not utilize antennas such as digital subscriber line (DSL) modems, cable modems, etc.

Figure 9A:
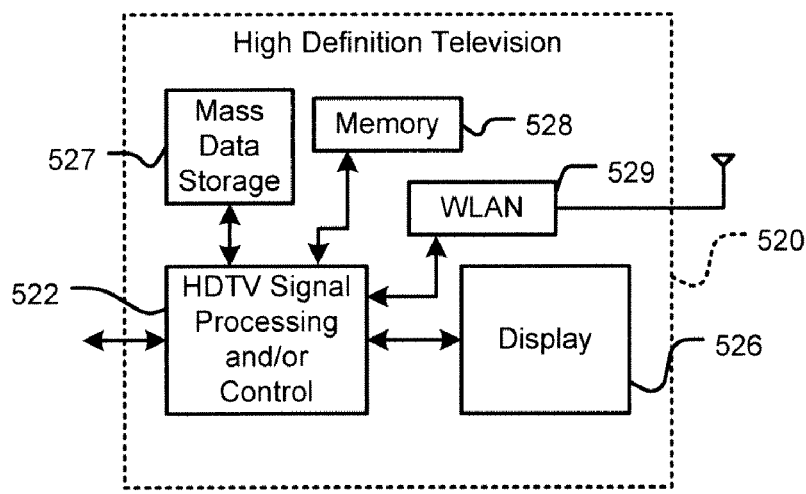
FIG. 9A is a block diagram of a high definition television that may utilize RF bandpass filter calibration techniques such as described herein.

Referring now to FIGS. 9A-9F, various example devices will be described that may utilize an RF bandpass calibration techniques such as described above. Referring to FIG. 9A, such techniques may be utilized in a high definition television (HDTV) 620. The HDTV 520 includes signal processing and/or control circuits, which are generally identified in FIG. 9A at 522, a WLAN interface 529, and a mass data storage 527. RF bandpass calibration techniques may be utilized in the WLAN interface 529 or the signal processing circuit and/or control circuit 522, for example. HDTV 520 receives HDTV input signals in either a wired or wireless format and generates HDTV output signals for a display 526. In some implementations, signal processing circuit and/or control circuit 522 and/or other circuits (not shown) of HDTV 520 may process data, perform coding and/or encryption, perform calculations, format data and/or perform any other type of HDTV processing that may be required.

HDTV 520 may communicate with mass data storage 527 that stores data in a nonvolatile manner such as optical and/or magnetic storage devices. The mass data storage 527 may include one or more hard disk drives (HDDs) and/or one or more digital versatile disks (DVDs). One or more of the HDDs may be a mini HDD that includes one or more platters having a diameter that is smaller than approximately 1.8". HDTV 520 may be connected to memory 528 such as RAM, ROM, low latency nonvolatile memory such as flash memory and/or other suitable electronic data storage. HDTV 520 also may support connections with a WLAN via the WLAN network interface 529.

Figure 9B:
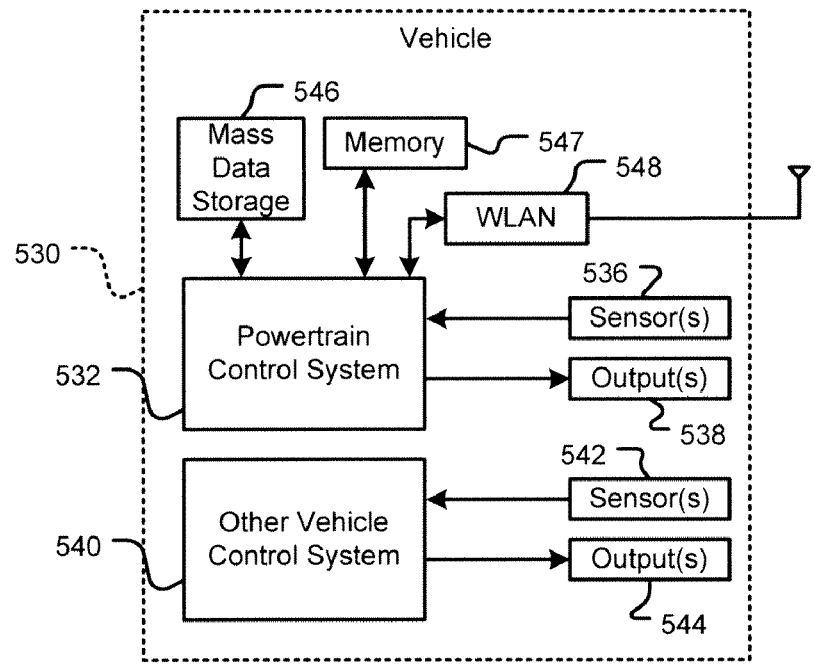
FIG. 9B is a block diagram of a vehicle that may utilize RF bandpass filter calibration techniques such as described herein.

Referring now to FIG. 9B, RF bandpass calibration techniques such as described above may be utilized in a control system of a vehicle 530. In some implementations, a powertrain control system 532 receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

A control system 540 may likewise receive signals from input sensors 642 and/or output control signals to one or more output devices 544. In some implementations, control system 540 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 532 may communicate with mass data storage 546 that stores data in a nonvolatile manner. Mass data storage 546 may include optical and/or magnetic storage devices for example hard disk drives HDD and/or DVDs. One or more of the HDDs may be a mini HDD that includes one or more platters having a diameter that is smaller than approximately 1.8". Powertrain control system 532 may be connected to memory 547 such as RAM, ROM, low latency nonvolatile memory such as flash memory and/or other suitable electronic data storage. Powertrain control system 532 also may support connections with a WLAN via a WLAN network interface 548. RF bandpass calibration techniques such as described above may be implemented in the WLAN interface 548. The control system 540 may also include mass data storage, memory and/or a WLAN interface (all not shown).

Figure 9C:
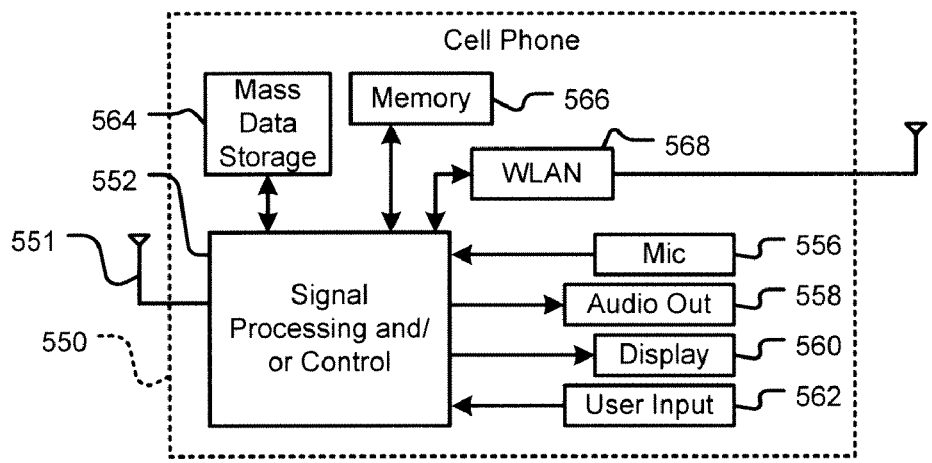
FIG. 9C is a block diagram of a cellular phone that may utilize RF bandpass filter calibration techniques such as described herein.

Referring now to FIG. 9C, techniques such as described above may also be utilized in a cellular phone 550 that may include a cellular antenna 551. The cellular phone 550 includes signal processing and/or control circuits, which are generally identified in FIG. 9C at 552, a WLAN interface 568, and a mass data storage 564. RF bandpass calibration techniques may be implemented in the signal processing and/or control circuits 552 and/or the WLAN interface 568, for example. In some implementations, cellular phone 550 includes a microphone 556, an audio output 558 such as a speaker and/or audio output jack, a display 560 and/or an input device 562 such as a keypad, pointing device, voice actuation and/or other input device. Signal processing and/or control circuits 552 and/or other circuits (not shown) in cellular phone 550 may process data, perforin coding and/or encryption, perform calculations, format data and/or perform other cellular phone functions.

Cellular phone 550 may communicate with mass data storage 564 that stores data in a nonvolatile manner such as optical and/or magnetic storage devices for example hard disk drives HDD and/or DVDs. At least one HDD may be a mini HDD that includes one or more platters having a diameter that is smaller than approximately 1.8". Cellular phone 550 may be connected to memory 566 such as RAM, ROM, low latency nonvolatile memory such as flash memory and/or other suitable electronic data storage. Cellular phone 550 also may support connections with a WLAN via a WLAN network interface 568.

Figure 9D:
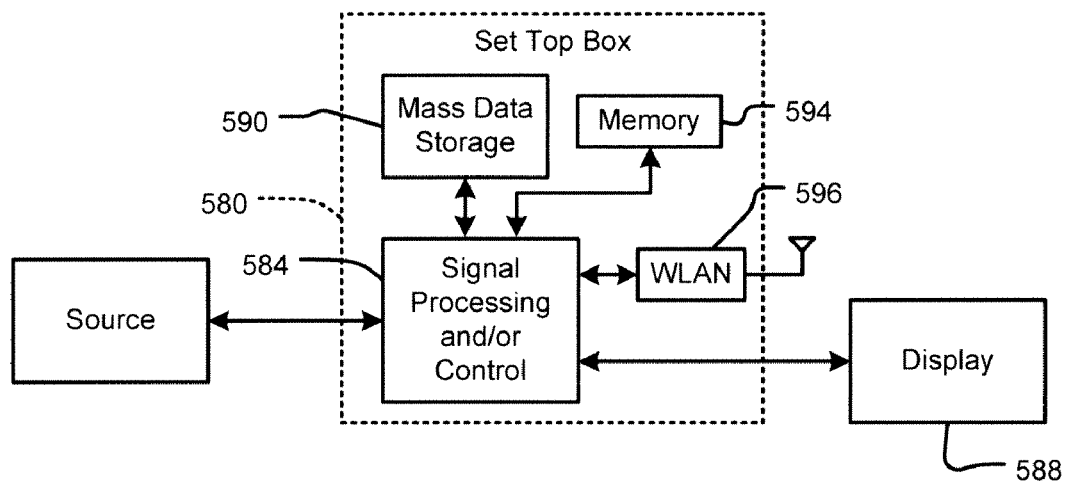
FIG. 9D is a block diagram of a set top box that may utilize RF bandpass filter calibration techniques such as described herein.

Referring now to FIG. 9D, techniques such as described above may be utilized in a set top box 580. The set top box 580 includes signal processing and/or control circuits, which are generally identified in FIG. 9D at 584, a WLAN interface 596, and a mass data storage device 590. RF bandpass calibration techniques may be implemented in the signal processing and/or control circuits 584 and/or the WLAN interface 596, for example. Set top box 580 receives signals from a source such as a broadband source and outputs standard and/or high definition audio/video signals suitable for a display 588 such as a television and/or monitor and/or other video and/or audio output devices. Signal processing and/or control circuits 584 and/or other circuits (not shown) of the set top box 580 may process data, perform coding and/or encryption, perform calculations, format data and/or perform any other set top box function.

Set top box 580 may communicate with mass data storage 590 that stores data in a nonvolatile manner. Mass data storage 590 may include optical and/or magnetic storage devices for example hard disk drives HDD and/or DVDs. At least one HDD may be a mini HDD that includes one or more platters having a diameter that is smaller than approximately 1.8". Set top box 580 may be connected to memory 594 such as RAM, ROM, low latency nonvolatile memory such as flash memory and/or other suitable electronic data storage. Set top box 580 also may support connections with a WLAN via the WLAN network interface 596.

Figure 9E:
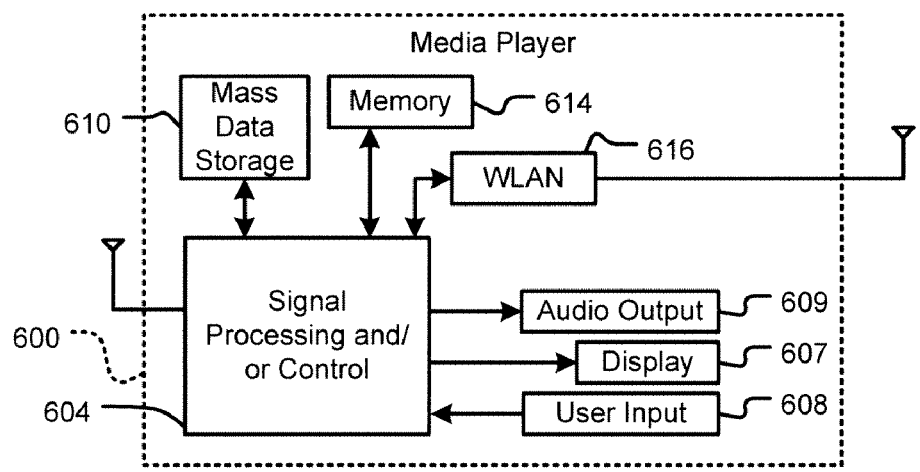
FIG. 9E is a block diagram of a media player that may utilize RF bandpass filter calibration techniques such as described herein.

Referring now to FIG. 9E, techniques such as described above may be utilized in a media player 600. The media player 600 may include signal processing and/or control circuits, which are generally identified in FIG. 9E at 604, a WLAN interface 616, and a mass data storage device 610. RF bandpass calibration techniques may be implemented in the signal processing and/or control circuits 604 and/or the WLAN interface 616, for example. In some implementations, media player 600 includes a display 607 and/or a user input device 608 such as a keypad, touchpad and the like. In some implementations, media player 600 may employ a graphical user interface (GUI) that typically employs menus, drop down menus, icons and/or a point-and-click interface via display 607 and/or user input device 608. Media player 600 further includes an audio output 609 such as a speaker and/or audio output jack. Signal processing and/or control circuits 604 and/or other circuits (not shown) of media player 600 may process data, perform coding and/or encryption, perform calculations, format data and/or perform any other media player function.

Media player 600 may communicate with mass data storage 610 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may be a mini HDD that includes one or more platters having a diameter that is smaller than approximately 1.8". Media player 600 may be connected to memory 614 such as RAM, ROM, low latency nonvolatile memory such as flash memory and/or other suitable electronic data storage. Media player 600 also may support connections with a WLAN via a WLAN network interface 616. Still other implementations in addition to those described above are contemplated.

FIG. 9E illustrates an antenna coupled to the signal processing and/or control circuits 604. The antenna may be a loop antenna, a whip antenna, headphone wires, a metal pad, a metal pad mounted on a device that so that, when worn, the metal pad will be in contact with a person's skin, etc.

Figure 9F:
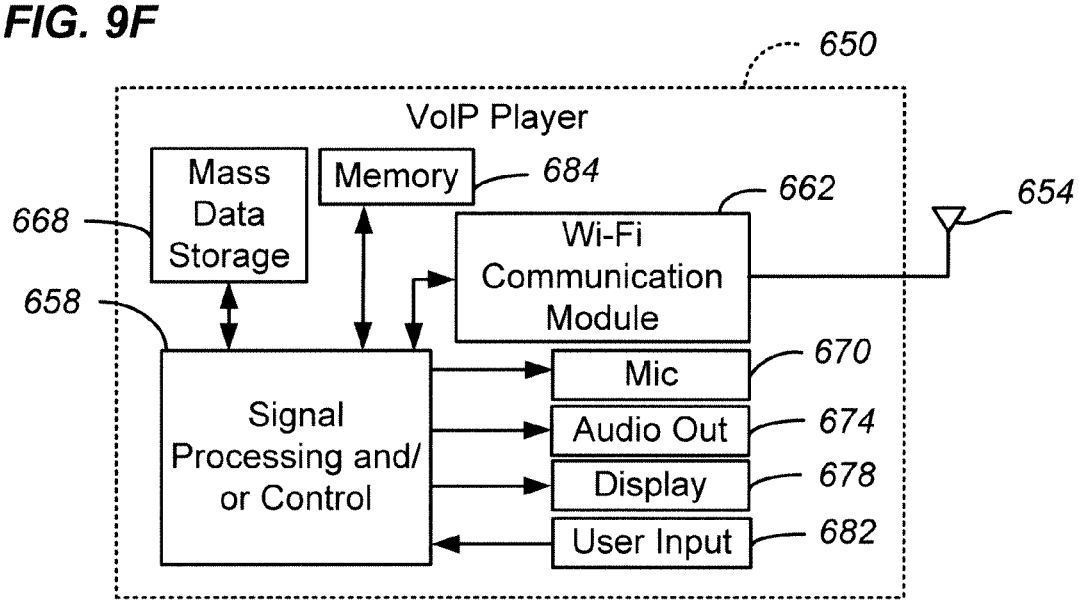
FIG. 9F is a block diagram of a voice over IP device that may utilize RF bandpass filter calibration techniques such as described herein.

Referring to FIG. 9F, techniques such as described above may be utilized in a Voice over Internet Protocol (VoIP) phone 650 that may include an antenna 654, signal processing and/or control circuits 658, a wireless interface 662, and a mass data storage 668. RF bandpass calibration techniques such as described above may be implemented in the signal processing and/or control circuits 658 and/or the wireless interface 662, for example. In some implementations. VoIP phone 650 includes, in part, a microphone 670, an audio output 674 such as a speaker and/or audio output jack, a display monitor 678, an input device 682 such as a keypad, pointing device, voice actuation and/or other input devices, and a Wireless Fidelity (Wi-Fi) communication module 662. Signal processing and/or control circuits 658 and/or other circuits (not shown) in VoIP phone 650 may process data, perform coding and/or encryption, perform calculations, format data and/or perform other VoIP phone functions.

VoIP phone 650 may communicate with mass data storage 668 that stores data in a nonvolatile manner such as optical and/or magnetic storage devices, for example hard disk drives HDD and/or DVDs. The HDD may be a mini HDD that includes one or more platters having a diameter that is smaller than approximately 1.8". VoIP phone 650 may be connected to memory 684, which may be a RAM, ROM, low latency nonvolatile memory such as flash memory and/or other suitable electronic data storage. VoIP phone 650 is configured to establish communications link with a VoIP network (not shown) via Wi-Fi communication module 662.

The various blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). The software may be machine readable instructions that are capable of causing one or more processors to perform various acts. When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A method for calibrating a bandpass filter, comprising:
    determining a respective received signal strength corresponding to each communication channel in a plurality of received communication channels;
    selecting a received communication channel from the plurality of received communication channels based on the received signal strengths of the plurality of received communication channels; and
    adjusting a variable element of the bandpass filter based on the received signal strength of the selected received communication channel to calibrate the bandpass filter.

2. The method according to claim 1, wherein selecting the received communication channel includes:
    determining a subset of the plurality of received communication channels having higher corresponding received signal strengths than other channels in the plurality of received communication channels based on a first set of received signal strength measurements; and
    selecting one of the received communication channels from the subset based on a second set of received signal strength measurements.

3. The method according to claim 2, wherein selecting one of the received communication channels from the subset comprises selecting a received communication channel having a highest corresponding received signal strength measurement from the second set of received signal strength measurements.

4. The method according to claim 2, wherein each measurement in the second set of received signal strength measurements is calculated based on a plurality of individual measurements.

5. The method according to claim 1, wherein determining the respective received signal strength comprises determining a received power measurement.

6. The method according to claim 5, wherein determining the received power measurement comprises determining a received signal strength indicator (RSSI) measurement.

7. The method according to claim 1, wherein determining the respective received signal strength comprises determining a bit error rate measurement.

8. The method according to claim 1, wherein adjusting the variable element of the bandpass filter comprises adjusting a variable capacitor.

9. The method according to claim 1, wherein adjusting the variable element of the bandpass filter based on the received signal strength of the received communication channel comprises adjusting the variable element of the bandpass filter to maximize the received signal strength of the selected received communication channel.

10. The method according to claim 1, further comprising freezing an automatic gain control of a receiver prior to adjusting the variable element of the bandpass filter.

11. The method according to claim 1, further comprising adjusting the receiver toward a center of the selected received communication channel prior to adjusting the variable element of the bandpass filter.

12. A system, comprising:
    a radio frequency (RF) bandpass filter having a variable element;
    a downconverter coupled to the RF bandpass filter, the downconverter including a received signal strength measurement module; and
    a controller coupled to the variable element of the RF bandpass filter and coupled to the received signal strength measurement module of the downconverter, wherein the controller is configured to
        select a received communication channel from a plurality of received communication channels based on received signal strengths of the plurality of received communication channels, and
        calibrate the RF bandpass filter by adjusting the variable element based on a received signal strength corresponding to the selected received communication channel.

13. The system according to claim 12, wherein the variable element of the RF bandpass filter includes a variable capacitor.

14. The system according to claim 12, wherein the controller is to select the received communication channel by determining a subset of the plurality of received communication channels having higher corresponding received signal strengths than other channels in the plurality of received communication channels based on a first set of received signal strength measurements and selecting one of the received communication channels from the subset based on a second set of received signal strength measurements.

15. The system according to claim 14, wherein the controller is to select a received communication channel having a highest corresponding received signal strength measurement from the second set of received signal strength measurements.

16. The system according to claim 15, wherein each measurement in the second set of received signal strength measurements is calculated based on a plurality of individual measurements.

17. The system according to claim 12, wherein the received signal strength measurement module comprises a received signal power measurement module.

18. The system according to claim 12, wherein the received signal strength measurement module comprises a bit error rate measurement module.

19. The system according to claim 12, wherein the controller is to calibrate the RF bandpass filter by adjusting the variable element of the bandpass filter to maximize the received signal strength of the selected received communication channel.

20. The system according to claim 12, wherein the downconverter comprises a mixer and a local oscillator (LO) generator coupled to the mixer;
    wherein the controller is coupled to the LO generator to adjust an LO frequency to reduce an LO frequency offset prior to adjusting the variable element to calibrate the RF bandpass filter.

21. The system according to claim 20, further comprising a variable gain amplifier coupled to an automatic gain control module;

wherein the controller is coupled to the automatic gain control module to freeze automatic gain control prior to adjusting the variable element to calibrate the RF bandpass filter.

22. The system according to claim 12, wherein the system comprises a receiver.

23. A method for calibrating a bandpass filter of a receiver, comprising:

selecting a received communication channel from a plurality of received communication channels;

adjusting the receiver toward a center of the selected received communication channel;

freezing an automatic gain control of the receiver;

determining a received signal strength corresponding to the selected received communication channel; and adjusting a variable element of the bandpass filter based on the received signal strength of the selected received communication channel to calibrate the bandpass filter.

* * * * *